United States Patent
Hoole et al.

(10) Patent No.: US 12,450,347 B2
(45) Date of Patent: Oct. 21, 2025

(54) TYPO SQUATTING, DEPENDENCY CONFUSION, AND BRANDJACKING DETECTION

(71) Applicant: MICRO FOCUS LLC, Santa Clara, CA (US)

(72) Inventors: Alexander Hoole, Vancouver (CA); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 424 days.

(21) Appl. No.: 17/681,143

(22) Filed: Feb. 25, 2022

(65) Prior Publication Data

US 2023/0273996 A1    Aug. 31, 2023

(51) Int. Cl.
G06F 21/56    (2013.01)

(52) U.S. Cl.
CPC .......... G06F 21/563 (2013.01); G06F 21/568 (2013.01); G06F 2221/034 (2013.01)

(58) Field of Classification Search
CPC .... G06F 21/563; G06F 21/568; G06F 21/566; G06F 2221/034
See application file for complete search history.

(56) References Cited

U.S. PATENT DOCUMENTS

| | | | |
|---|---|---|---|
| 10,409,654 B2 * | 9/2019 | Behrendt | G06F 8/60 |
| 10,764,307 B2 | 9/2020 | Manadhata | |
| 10,805,318 B2 | 10/2020 | Manadhata | |
| 11,429,515 B1 * | 8/2022 | Bartling | G06F 11/3692 |
| 2006/0230289 A1 * | 10/2006 | Fox | G06F 21/563 713/188 |
| 2011/0239294 A1 * | 9/2011 | Kim | G06F 21/563 726/22 |
| 2012/0030762 A1 * | 2/2012 | Klein | G06F 21/57 726/23 |
| 2020/0389468 A1 | 12/2020 | Manadhata | |
| 2021/0056209 A1 * | 2/2021 | Fox | G06F 21/563 |
| 2022/0038424 A1 * | 2/2022 | Liu | H04L 63/1483 |

OTHER PUBLICATIONS

Gary Rowe; "BITCOINJ Enforcer Rules"; Sep. 5, 2013; 7 pages https://github.com/gary-rowe/BitcoinjEnforcerRules.
Sherif Koussa; "13 Tools For Checking The Security Risk Of Open-Source Dependencies"; TECH BEACON—Micro Focus; https://techbeacon.com/app-dev-testing/13-tools-checking-security-risk-open-source-dependencies; copyright 2015-2022.

* cited by examiner

Primary Examiner — Sangseok Park
(74) Attorney, Agent, or Firm — Sheridan Ross P.C.

(57) ABSTRACT

A software build environment is scanned for one or more potentially malicious code paths. In response to scanning the software build environment for the one or more potentially malicious code paths, one or more potentially malicious code paths are identified. The identified one or more potentially malicious code paths comprise at least one of: a typo squat code path, a dependency confusion code path, and a brandjack code path. In response to identifying the one or more potentially malicious code paths a microprocessor does at least one of: generate a notification identifying the one or more potentially malicious code paths, automatically change and/or remove the one or more potentially malicious code paths and deny the start of a build process.

20 Claims, 4 Drawing Sheets

TYPO SQUATTING, DEPENDENCY CONFUSION, AND BRANDJACKING DETECTION

FIELD

The disclosure relates generally to source code build environments and particularly to detection of typo squatting, dependency confusion, and brandjacking detection in source code build environments.

BACKGROUND

With the proliferation of the use of open-source software and third-party software for developing software applications, it has become an increasing difficult technical problem for companies/developers to identify whether malware has been introduced into a software build process. Malicious hackers have begun to start using open-source software components/third-party software components as a way to introduce malware into the software build process. This can pose a significant threat to network security, device security, and information security. Many times, the malware is identified long after the software with the malicious code is installed within a computer network. As computer networks have become increasing complex (e.g., with tens of thousands of software applications running tens of thousands of devices), it has become even more difficult to identify malware once it has been introduced into a computer network.

SUMMARY

These and other needs are addressed by the various embodiments and configurations of the present disclosure. A software build environment is scanned for one or more potentially malicious code paths. In response to scanning the software build environment for the one or more potentially malicious code paths, one or more potentially malicious code paths are identified. The identified one or more potentially malicious code paths comprise at least one of: a typo squat code path, a dependency confusion code path, and a brandjack code path. In response to identifying the one or more potentially malicious code paths a microprocessor does at least one of: generate a notification identifying the one or more potentially malicious code paths, automatically change and/or remove the one or more potentially malicious code paths and deny the start of a build process.

The present disclosure can provide several advantages depending on the configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
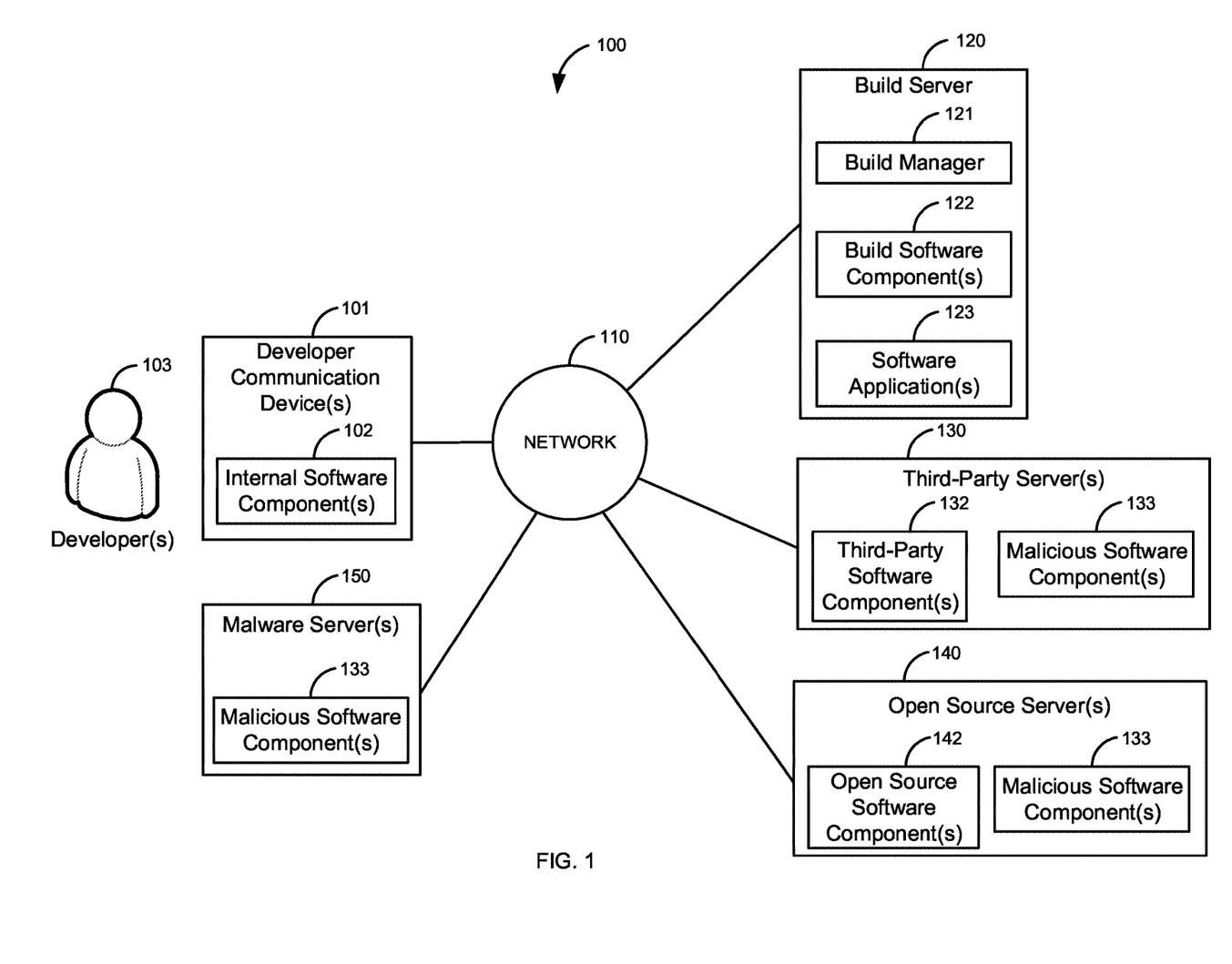
FIG. 1 is a block diagram of a first illustrative system for detection of potentially malicious code paths.

FIG. 1 is a block diagram of a first illustrative system 100 for detection of potentially malicious code paths. The first illustrative system 100 comprises developer communication device(s) 101, a network 110, a build server 120, third-party software server(s) 130, open-source software server(s) 140, and malware server(s) 150. In addition, FIG. 1 shows developer(s) 103 for convenience. The developer 103 is a person who develops the internal software components 102. The developer 103 may also run the software build process.

The developer communication device(s) 101 can be or may include any developer device that can communicate on the network 110, such as a Personal Computer (PC), a tablet device, a notebook device, a laptop computer, and/or the like. Although FIG. 1 only shows a single developer communication device 101; however, in some configurations, there may be more than one developer communication device 101. For example, in a large software development process, there may be many developer communication devices 101/developers 103 that contribute the internal developed software components 102 as part of a software build process.

The developer communication device 101 further comprises the internal software component(s) 102. As shown in FIG. 1, the internal software component(s) 102 may be stored locally on the developer communication device 101. However, in other embodiments, the internal software component(s) 102 may reside on the build server 120. For example, for a large software development process there may be many developers 103 that store their individually developed software component(s) 102 on the build server 120 as part of the build software component(s) 122. In one embodiment, the developer 103 may generate the internal software component(s) 102 and then check in the internal software component(s) 102 into the build software component(s) 122.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The build server 120 is a server used for managing a build process for developing the software application(s) 123. The build server 120 comprises a build manager 121, the build software component(s) 122, and the software application(s) 123. The build manager 121 is used to identify the locations of various software components (e.g., the internal software component(s) 102, the third-party software component(s) 132, and/or the open-source software component(s) 142). The identified software components comprise the build software component(s) 122. The build manager 121 is used to generate the software application(s) 123 based on the build software components 122.

The third-party server(s) 130 are servers where the build manager 121 may retrieve the third-party software components 132. The third-party component(s) 132 may be software component(s) that have been licensed by an enterprise to help build the software application(s) 123. For example, the developer 103 may use the Java class libraries to develop a Java software application 123. In addition to the third-party software component(s) 132, the third-party server(s) 130 may also include malicious software component(s) 133. The malicious software component(s) 133 may have been introduced into the third-party server(s) 130 by a hacker who has compromised the third-party server(s). The malicious software component(s) 133 on the third party-server(s) 130 have different code paths and/or names on the third-party software component(s) 132.

The open-source server(s) 140 are servers where the build manager 121 may retrieve the open-source software components 142 for building a software application 123. The open-source component(s) 142 may be software component(s) that are licensed under one or more open-source licenses, such as, the GNU General Public Licenses (GPL), The Eclipse Public License (EPL), the Mozilla Public License (MPL), the Apache License, the MIT License, the BSD license, and/or the like. An example, of an open-source server 140 would be GitHub® (e.g., see https://github.com/). The open-source server(s) 140 may also include the malicious software component(s) 133. The malicious software component(s) 133 on the open-source server(s) 140 have a different code path and/or name that the open-source software component(s) 142.

The malware server(s) 150 are servers setup by malicious parties to introduce malicious software components 133 into the build process. The malware server(s) 150 include the malicious software component(s) 133. The malware server(s) 150 use malicious code paths to introduce malware into the build environment.

Figure 2:
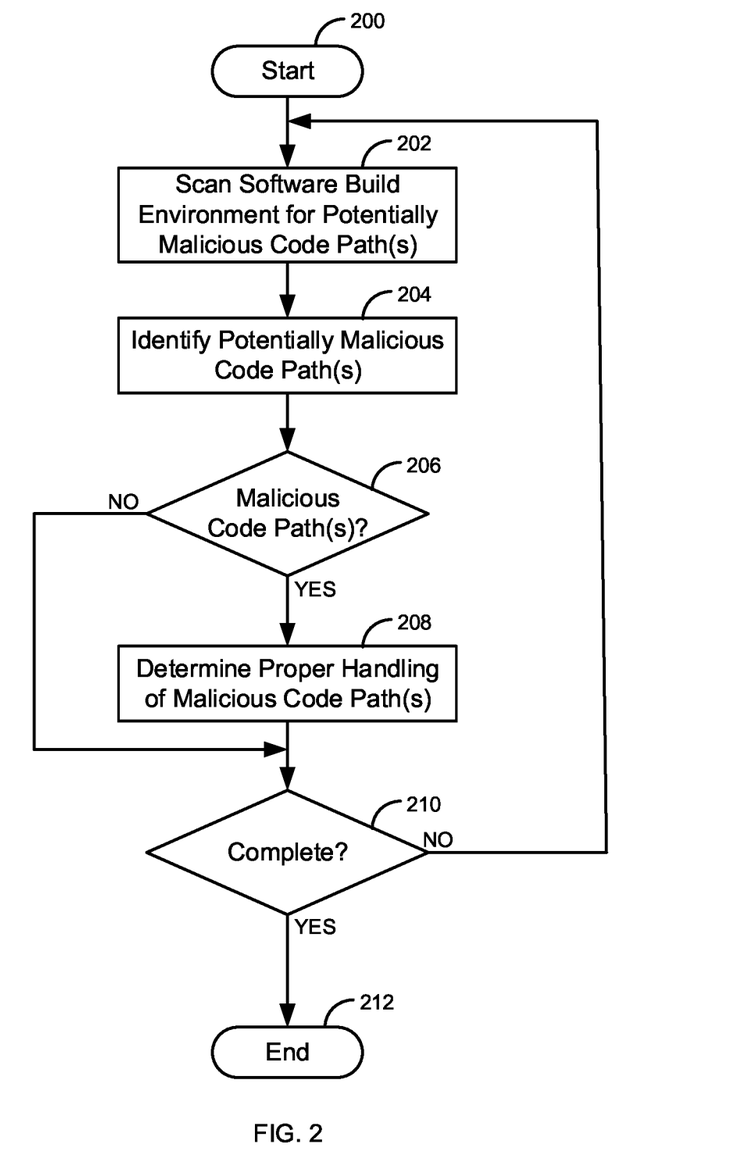
FIG. 2 is a flow diagram of a process for detection of potentially malicious code paths.
Figure 3:
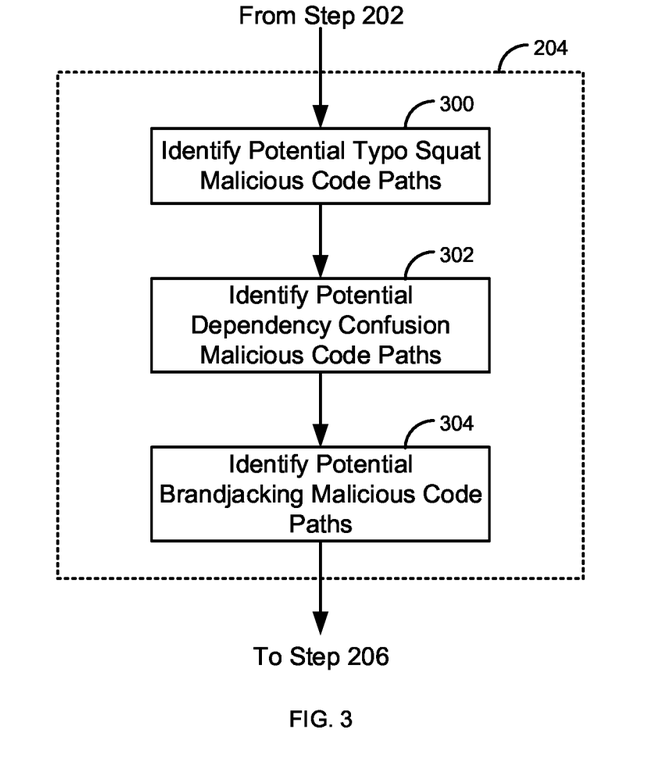
FIG. 3 is a flow diagram of a process for identifying different types of potentially malicious code paths.
Figure 4:
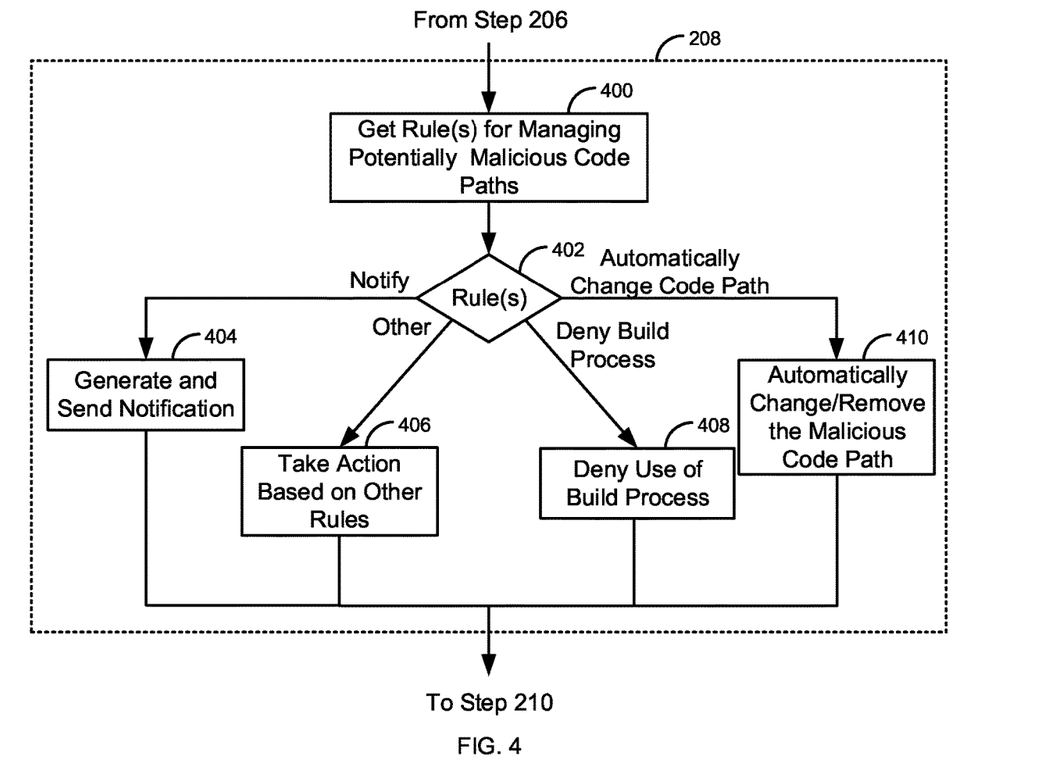
FIG. 4 is a flow diagram of a process for handling identified potentially malicious code path(s).

FIG. 2 is a flow diagram of a process for detection of potentially malicious code paths. Illustratively, the developer communication device(s) 101, the internal software component(s) 102, the build server 120, the build manager 121, the build software component(s) 122, the software application(s) 123, the third-party server(s) 130, the third-party software component(s) 132, the open-source server(s) 140, the open-source software component(s) 142, the malware server(s) 150, and the malicious software component(s) 133 are stored-program-controlled entities, such as a computer or microprocessor, which performs the method of FIGS. 2-4 and the processes described herein by executing program instructions stored in a computer readable storage medium, such as a memory (i.e., a computer memory, a hard disk, and/or the like). Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The build manager 121 scans, in step 202, the software build environment for potentially malicious code path(s). The build environment may include configuration files that the developer 103 creates that contain the code paths. As part of the build process, the developer 103 may define code paths to bring in specific software components for building the software application(s) 123. For example, the developer 103 may define code paths to the internal software component(s) 102, the third-party software component(s) 132, and/or the open-source software components 142. Based on the defined code paths, the build manager 121 gets all the software components 102, 132, and/or 142). These software components 102, 132, 142 comprise the build software components 122. The build manager 121 creates the software application(s) 123 based on the build software components 122.

As part of the build process, the build manager 121 identifies, in step 204, any potentially malicious code paths. A potentially malicious code path may be identified based on various conditions, such as, a typo squat malicious code path, a dependency confusion code path, a brandjacking code path, and/or the like.

To illustrate, consider the following example of a typo squat malicious code path. After initially vetting an open-source software component 142, typosquatting can occur where a developer 103 is trying to link to a legitimate open-source server 140 (e.g., an open-source software repository) using a legitimate Uniform Resource Locator (URL)/class path/filename to pull in a legitimate open-source software component 142; however, the developer 103 has made a mistake when typing in the path (URL) or relevant identifiers (e.g., group ID, artifact ID, version, etc.). For example, the developer 103 wants to bring in the same version of an open-source software component 142 that is licensed under a less restrictive open-source license where the new open-source component 142 is stored on a different open-source server 140. Here, the developer 103 changes the code path to point to the open-source component 142 with the less restrictive open-source license. For example, at a high level, the developer wants to download the new open-source component 142 at the link http://test_code.com/foo.java. The developer mistakenly types in the link http://test_code.com/goo.java. A hacker has uploaded a malicious software component 133 at the link http://test_code.com/goo.java intentionally trying to catch this type of mistake.

Here the mistake is where f and g are next to each other on the keyboard and the developer typed the typo squatted path instead of the legitimate path to the open-source component 142. Thus, without knowing, the developer links in the malicious software component 133 that he/she thinks is legitimate, but instead, what is downloaded contains malware. While the above example uses a trivial dependency download from a URL, in practice, component dependencies are downloaded from software repositories such as Maven, PyPI, npm (e.g., see (https://docs.npmjs.com/cli/v7/configuring-npm/package-json), RubyGems, and/or the like. Typo squatting can be related to multiple metadata fields used in the configuration files for these package management frameworks.

Another example would be where the user made a mistake typing in the URL. In this example, the hacker has setup the malicious server 150 with the typo squatted URL. Thus, the developer unknowingly links to the malicious software component 133 on the malicious server 150.

One way to identify the typo squatting is to have a process that identifies potential typosquatting issues by looking at the code path/URL. Based on the names in the path, (could be in the URL and/or path/name) the build manager 121 identifies a list of potential typo squatting URLs/paths. For example, a typo squat may be where keyboard keys next to each other, an extra character is added to the code path, a character is missing from the code path, the code path contains switched characters, the code path contains hyphenated strings, the code path contains a spelling mistake, the code path contains an alternate spelling, the code path contains an incorrect domain ending, the code path contains a pluralization, and/or the like. This list is then used to identify potential illegitimate code paths based on previously known legitimate code paths. The legitimate code path(s) may be learned or come from a list of valid code paths. For example, the list of valid code paths may be stored on the network 110.

A typo squat can be identified on either the developer communication device 101, the host of the software component (e.g., third-party server 130 or open-source server 140), and/or on the build server 120. Any of these can check for potential typo squats after the legitimate component is accessed or checked in.

One way to check for a potential typo squat is to verify a hash of the software component and the path (a hash would be retained for each version). The software component hash would identify if the code was modified and thus legitimate or not. The software component hash may be retrieved from an external database (or internal database)/search engine. If the hash for the new component does not match a valid hash from the database/search, the path/software component may be flagged as being potentially bad or questionable. The code path could also be validated based on a hash of the code path. The path not having changed, but the component hash having changed would indicate a new software component. A code path hash change without a component hash change may be 'okay' however it may be flagged as a potential concern. These checks solve the problem described above where a code path to the same open-source component changed to use a more restrictive license. Another issue may be where the code is the same, but the comments within the code may be different. For example, the comments may have the open-source license (e.g., one with a GPL license and one with a BSD license). Thus, the hash would be only over actual code and would ignore the comments.

Another potential malicious code path may be based on what is called dependency confusion. The developer 103 may want to pull in the latest version of a software component (e.g., an open-source software component 142). The developer may define the code path in the build environment for the open-source software component 142 as http://test_code/foo1.*.java (meaning to bring in the latest version of the component foo1.*.java). Alternatively, the developer may also define multiple paths to pull in the latest version. For example, the latest version may be version 1.1. A malicious actor may add a malicious software component 133 (e.g., that appears to be a new version 1.2 of the open-source software component 142) in the alternative path. Thus, when the build process is run, the malicious software component 133 that is brought into the software application 123, even though the build environment has not changed. As a result, the developer 103 is unaware of the newly added malicious software component 133.

One way to deal with dependency confusion is to scan the build environment for any cases where more than one path/version can be used. For example, where the developer 103 uses an * (a wild card character) for identifying the version, a ^ (identifies a compatible version) is used with a version, or where the build environment has multiple paths (i.e., multiple open-source servers 140/repositories) to the same component for getting the latest compatible version. As a specific example, JavaScript's npm provides syntax for specifying dependencies in the 'package.json' file. This syntax provides multiple notations for component version which can be leveraged for dependency confusion (e.g., >, >=, <, <=, ~, ^, *, " ", etc., e.g., see https://docs.npmjs.com/cli/v7/configuring-npm/package-json, version 7x). The use of these types of identifiers in the code path can be flagged. For example, the developer 103 could be presented a screen that shows all the possible versions that can be downloaded and warn the developer 103 about possible malware in a new component that has not been used before.

One way to identify legitimate software components to use the hash checks. Hash checks could also be used for typo squatting and dependency confusion. If a hash check fails, the developer 103 could also be warned. Another option would be to only allow a single path (repository)/version. In addition, an option would be to dynamically do a malware scan of all versions if the version/path changes (e.g., where 1.* was used in the path).

Another option is to check for brandjacking. Brandjacking is where a brand (e.g., a trademark/name) is used in a nefarious manner. The hacker tries to make the web site seem like the legitimate web site. For example, a web site may take source code/look and feel of a legitimate web site and make it appear to be a legitimate web site that is hosting open-source software component(s) 142. The fake web site (the malware server 150) may look almost identical to the real web site (e.g., an open-source repository) and have various malicious software components 133 that appear to be legitimate. Thus, when the developer 103 links to the malware server 150, the developer 103 is unaware that he/she is linking to an illegitimate web site. Brandjacked web sites can be identified in a similar manner as typo squatted web sites. In addition, a list of valid repositories may be used to identify a web site that may be potentially brandjacked.

The process can also check for potentially malicious code paths in a dependency tree. A dependency tree is where a potentially malicious code path occurs upstream in the software supply chain. For example, if the code path in the build environment to the software component is http://test_code.com/foo.java and this has been entered correctly in the build environment, what happens if the component foo.java is also dependent on the component foolib.java from the site http://foocode.com/foolib.java? If the code path http://foocoed.com/foolib.java (d and e are switched in the path) has been typo squatted, the build manager 121 then checks the dependency tree for typosquatting. In this example, if there is an invalid dependency, the typo squat of the second level of the dependency tree, it is flagged in the same manner as discussed above. The dependency tree can be identified at the hosting server where the second level software component resides. The potentially malicious code path may be detected at an even higher level (e.g., at a third level or higher).

Detection of typo squatting, dependency confusion, and brandjacking can be identified at the same time. The build manager 121 identifies the potential malicious code paths (or other identifiable metadata-such as a group id) and then either notifies of an attempt to add a component with a malicious code path and/or blocks the addition of the component that appears to have a malicious code path. In other words, a more controlled check in or extraction process is created. An administrator may allow or not allow the addition of the new software component. For example, if the development environment uses 1.*.java (dependency confusion) and there is a typo squat on the second level of the dependency tree, both types of issues can be flagged like discussed above.

The build manager 121 determines, in step 206, if there are any identified potential malicious code paths. If there are not any identified potential malicious code paths in step 206, the process goes to step 210. Otherwise, if there one or more potential code paths identified in step 206, the build manager 121 determines how to handle the potential malicious code paths in step 208. How the malicious code paths are handled can be based on one or more rules. For example, the developer 103 may be notified and asked to approve/not approve allowing the use of the new software component. The process then goes to step 210.

The build manager 121 determines, in step 210, if the process is complete. If the process is not complete in step 210, the process goes to step 202. Otherwise, if the process is complete in step 210, the process ends in step 212.

FIG. 3 is a flow diagram of a process for identifying different types of potentially malicious code paths. FIG. 3 is an exemplary embodiment of step 204 of FIG. 2. After scanning the software build environment for potentially malicious code path(s) in step 202, the build manager 121 identifies, in step 300, potential typo squat malicious code paths (e.g., like described above). The build manager 121, identifies potential dependency confusion malicious code paths in step 302 (e.g., like described above). The build manager 121 identifies, in step 304, potential brandjacking malicious code paths (e.g., like described above). The process goes to step 206.

The orders of steps 300-304 may occur in different orders or in parallel. Moreover, one or more of the steps 300-304 may or may not be implemented based on one or more rules.

FIG. 4 is a flow diagram of a process for handling identified potentially malicious code path(s). FIG. 4 is an exemplary embodiment of step 208 of FIG. 2. If one or more potentially malicious code paths have been identified in step 206, the build manager 121 gets the rule(s) for managing malicious code paths in step 400. Based on the rule(s), the build manager 121, in step 402, implements the rules.

If the rule is to notify the developer 103 of the potentially malicious code path in step 402, the build manager 121 generates and sends a notification to the developer in step 404. Step 404 may also include getting approval of the developer to bring a software component that has a potentially malicious code path. The process then goes to step 210. Step 404 may also include hash checking.

If the rule is to take another action based on the rule(s), the build manager 121 acts based on the rule(s) in step 406.

The process then goes to step 210. If the rule is to deny the build process (e.g., not compile the software application 123) the build manager 121 denies use of the build process in step 408. Step 408 may be used on conjunction with the hash checking described above. For example, if a hash check fails on a new software component, the build process may be denied in step 408. The process then goes to step 210. If the rule is to automatically change/remove the potentially malicious code path according to the rule(s) in step 402, the build manager 121 automatically changes/removes the potentially malicious code path in step 410. This may be based on the developer's 103 approval as well. Step 410 may also be based on hash checking. The process then goes to step 210.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits several known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that can supply and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

Several variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the function, and the software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to standards and protocols, the disclosure is not limited to such standards and protocols. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   a microprocessor; and
   a computer readable medium, coupled with the microprocessor and comprising microprocessor readable and executable instructions that, when executed by the microprocessor, cause the microprocessor to:
   scan a software build environment for one or more potentially malicious code paths;
   in response to scanning the software build environment for the one or more potentially malicious code paths, identify the one or more potentially malicious code paths,
   wherein at least one of the one or more potentially malicious code paths is identified as being malicious based on comparing a hash of the at least one of the one or more potentially malicious code paths with a known hash of a legitimate version of a code path for the at least one of the one or more potentially malicious code paths, and
   wherein the identified one or more potentially malicious code paths comprise at least one of: a typo squat code path, a dependency confusion code path, and a brand-jack code path; and
   in response to identifying the one or more potentially malicious code paths, the microprocessor
   denies the start of a build process.

2. The system of claim 1, wherein the microprocessor readable and executable instructions further cause the microprocessor to:
   in response to scanning the software build environment for the one or more potentially malicious code paths:
   identify one or more software components associated with the one or more potentially malicious code paths; and
   compare hashes for the one or more software components to known hashes of legitimate versions of the one or more software components to validate whether the one or more software components are valid.

3. The system of claim 1, wherein identifying the one or more potentially malicious code paths comprises the typo squat code path.

4. The system of claim 3, wherein the typo squat code path is identified based on at least one of: keyboard keys next to each other, an extra character, a missing character, switched characters, a hidden character, other special characters, hyphenated strings, a spelling mistake, an alternate spelling, use of alternate character encoding standards, an incorrect domain ending, and a pluralization.

5. The system of claim 1, wherein identifying the one or more potentially malicious code paths comprises the dependency confusion code path.

6. The system of claim 5, wherein the dependency confusion code path is identified based on at least one of: a version indicator, a less than version indicator, a less than or equal to version indicator, a greater than version indicator, a greater than or equal to version indicator, approximately equivalent to version indicator, a compatible with version indicator, and a range of version indicator.

7. The system of claim 1, wherein identifying the one or more potentially malicious code paths comprises the brand-jack code path.

8. The system of claim 1, wherein the at least one of the one or more potentially malicious code paths is based on a second level or greater of a dependency tree.

9. The system of claim 1, wherein scan the software build environment for one or more potentially malicious code paths includes scan a plurality of code paths including at least one of code paths to internal software components, code paths to third-party software components and code paths to open-source software components.

10. A method, comprising:
    scanning, by a microprocessor, a software build environment for one or more potentially malicious code paths;
    in response to scanning the software build environment for the one or more potentially malicious code paths, identifying, by the microprocessor, the one or more potentially malicious code paths,
wherein at least one of the one or more potentially malicious code paths is identified as being malicious based on comparing a hash of the at least one of the one or more potentially malicious code paths with a known hash of a legitimate version of a code path for the at least one of the one or more potentially malicious code paths, and
wherein the identified one or more potentially malicious code paths comprise at least one of: a typo squat code path, a dependency confusion code path, and a brandjack code path; and
in response to identifying the one or more potentially malicious code paths,
denying, by the microprocessor, the start of a build process.

11. The method of claim 10, further comprising:
in response to scanning the software build environment for the one or more potentially malicious code paths:
identifying one or more software components associated with the one or more potentially malicious code paths; and
comparing hashes for the one or more software components to known hashes of legitimate versions of the one or more software components to validate whether the one or more software components are valid.

12. The method of claim 10, wherein identifying the one or more potentially malicious code paths comprises the typo squat code path.

13. The method of claim 12, wherein the typo squat code path is identified based on at least one of: keyboard keys next to each other, an extra character, a missing character, switched characters, a hidden character, other special characters, hyphenated strings, a spelling mistake, an alternate spelling, use of alternate character encoding standards, an incorrect domain ending, and a pluralization.

14. The method of claim 10, wherein identifying the one or more potentially malicious code paths comprises the dependency confusion code path.

15. The method of claim 14, wherein the dependency confusion code path is identified based on at least one of: a version indicator, a less than version indicator, a less than or equal to version indicator, a greater than version indicator, a greater than or equal to version indicator, approximately equivalent to version indicator, a compatible with version indicator, and a range of version indicator.

16. The method of claim 10, wherein identifying the one or more potentially malicious code paths comprises the brandjack code path.

17. The method of claim 10, wherein the at least one of the one or more potentially malicious code paths is based on a second level or greater of a dependency tree.

18. The method of claim 9, scanning, by the microprocessor, the software build environment for one or more potentially malicious code paths includes scanning, by the microprocessor, a plurality of code paths including at least one of code paths to internal software components, code paths to third-party software components and code paths to open-source software components.

19. A non-transient computer readable medium having stored thereon instructions that cause a processor to execute a method, the method comprising:
instructions to:
scan a software build environment for one or more potentially malicious code paths;
in response to scanning the software build environment for the one or more potentially malicious code paths, identify the one or more potentially malicious code paths,
wherein at least one of the one or more potentially malicious code paths is identified as being malicious based on comparing a hash of the at least one of the one or more potentially malicious code paths with a known hash of a legitimate version of a code path for the at least one of the one or more potentially malicious code paths, and
wherein the identified one or more potentially malicious code paths comprise at least one of: a typo squat code path, a dependency confusion code path, and a brandjack code path; and
in response to identifying the one or more potentially malicious code paths,
deny the start of a build process.

20. The non-transient computer readable medium of claim 19, wherein scan the software build environment for one or more potentially malicious code paths includes scan a plurality of code paths including at least one of code paths to internal software components, code paths to third-party software components and code paths to open-source software components.

* * * * *